United States Patent
Garg et al.

(10) Patent No.: US 10,126,984 B2
(45) Date of Patent: Nov. 13, 2018

(54) CACHING OF METADATA FOR DEDUPLICATED LUNS

(71) Applicant: Violin Systems LLC, San Jose, CA (US)

(72) Inventors: Amit Garg, Cupertino, CA (US); Vikas Ratna, San Jose, CA (US)

(73) Assignee: VIOLIN SYSTEMS LLC, San Jose, CA (US)

( * ) Notice: Subject to any disclaimer, the term of this patent is extended or adjusted under 35 U.S.C. 154(b) by 0 days.

(21) Appl. No.: 15/847,316

(22) Filed: Dec. 19, 2017

(65) Prior Publication Data

US 2018/0121362 A1      May 3, 2018

Related U.S. Application Data

(62) Division of application No. 14/971,285, filed on Dec. 16, 2015, now Pat. No. 9,852,076.

(60) Provisional application No. 62/093,720, filed on Dec. 18, 2014.

(51) Int. Cl.
*G06F 12/08*   (2016.01)
*G06F 3/06*    (2006.01)
*G06F 17/30*   (2006.01)

(52) U.S. Cl.
CPC ............ *G06F 3/067* (2013.01); *G06F 3/0608* (2013.01); *G06F 3/0641* (2013.01); *G06F 17/30132* (2013.01); *G06F 2212/604* (2013.01); *G06F 2212/62* (2013.01); *G06F 2212/70* (2013.01)

(58) Field of Classification Search
CPC ......... G06F 17/30132; G06F 2212/604; G06F 2212/62; G06F 2212/70; G06F 3/0608; G06F 3/0641; G06F 3/067
See application file for complete search history.

(56) References Cited

U.S. PATENT DOCUMENTS

2012/0159098 A1    6/2012  Cheung

*Primary Examiner* — Yong Choe
(74) *Attorney, Agent, or Firm* — Schwabe Williamson & Wyatt

(57) ABSTRACT

Efficient processing of user data read requests in a deduplicated data storage system places the metadata for most frequently requested data in data structures and locations in the system hierarchy where the metadata will be most rapidly available. The total amount of such metadata makes storing all of the metadata in high speed memory expensive, and the system and method described uses both the temporal and the spatial characteristics of the user system activity in any epoch to adjust the contents of metadata cache so as to respond to the dynamics of a multi user or multi-application environment where the storage system is not made aware of the time changing mix of operations except by observation of the individual requests. A history record is used to promote metadata from the slow memory to the fast memory, and a process selection may be adjusted based on the address-space activity.

9 Claims, 7 Drawing Sheets

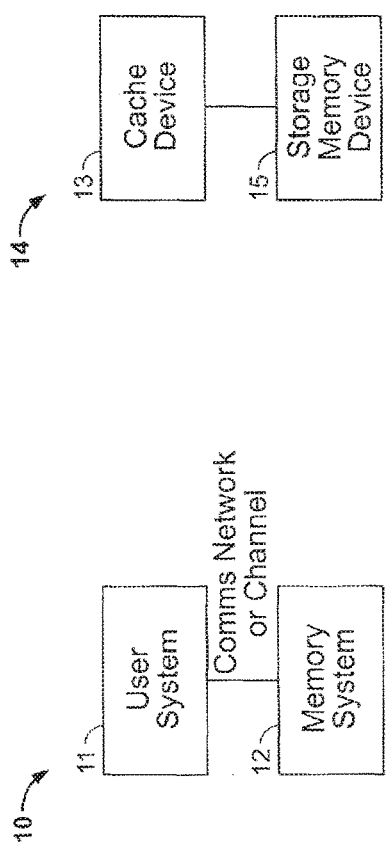
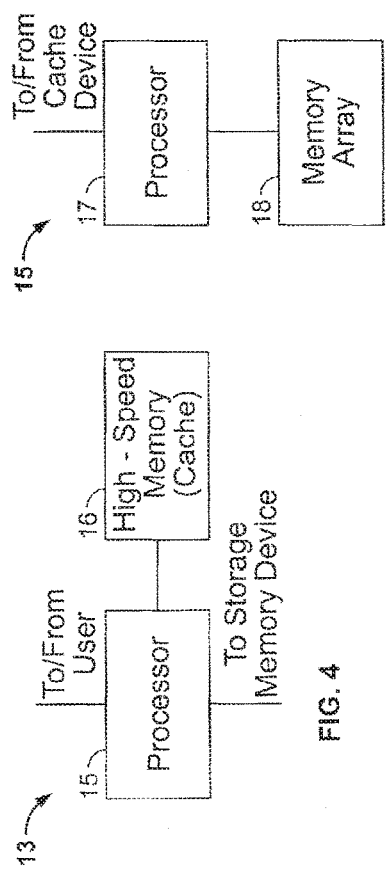
FIG. 3
FIG. 5
FIG. 2
FIG. 4

CACHING OF METADATA FOR DEDUPLICATED LUNS

This application is a divisional application of U.S. application Ser. No. 14/971,285 filed on Dec. 16, 2015, which claims the benefit of U.S. provisional application No. 62/093,720, filed on Dec. 18, 2014, each of which is incorporated herein by reference.

TECHNICAL FIELD

The subject matter of the present application may be related to data storage systems.

BACKGROUND

A common architecture for enterprise computing systems includes a client computer and a storage system, where the client system performs most of the computational intensive tasks using applications programs and the information needed for the computation was retrieved from a storage system. Often the storage system was not directly attached to the computer. The connection between the two system components depended on the data storage concept and is often described as a SAN where data was stored as fixed sized blocks and as a NAS where data was stored as files.

The storage component has been typically comprised of a server computer and a plurality of hard disk drives for the actual data storage. Files are often used for unstructured data such as images, text and the like, whereas block storage has been associated with, for example, database processing. In all of these applications, the response time of the storage component of a computing system has been limited by the mechanical performance of the associated disk drives. Mixed workloads, such as a combination of block and file applications, were avoided due to unfavorable interactions between the access requirements.

Flash memory arrays are replacing disk storage devices in many applications due to the more rapid response time to client requests for reading and writing data as well as a capability to perform a much higher number of input/output (I/O) operations per second. However, at present, the hardware cost of the flash memory is greater than that of disk and the flash memory is perceived to have a wear-out problem, at least if not properly managed. The amount of data to be stored on a global basis appears to be growing substantially, despite all efforts to restrict this growth, and more efficient data storage techniques have been developed such as data de-duplication and data compression. Cost and performance are important considerations in the design and economics of data storage systems.

With disk storage systems, post-storage deduplication may be performed; the data to be written to the storage device is usually first written to a disk and may subsequently de-duplicated or compressed so as to optimize disk performance. Often the deduplication is not performed until the data is backed up; the process is costly both computationally and in terms of volatile metadata storage. However, the wear-our characteristics of flash memory have led to the performance of these data reduction techniques in-line in order to reduce the amount of data that is actually initially stored in the storage array.

Data de-duplication may effective for certain application types such as email attachments, operating system or virtual desktop images and the like, and is usually less effective for data base information. Similarly, data compression may be effective for data base information, text files and the like, but may be relatively ineffective for encrypted or already compressed data. Selection of data deduplication or data compression may be done either heuristically or as selected by the user at some level of the storage architecture and the specific response of a storage system to such selections depends, for example, on the details of the processes performed by the storage system, on the data being processed, and on the temporal characteristics of the work load.

SUMMARY

A system and method of managing metadata for deduplicated data stored in non-volatile memory is disclosed, the method comprising: maintaining metadata for deduplicated data in a non-volatile storage memory; maintaining a cache of metadata for deduplicated data, wherein the cache of metadata is a subset of the metadata for deduplicated data and is maintained in a higher speed memory than the non-volatile storage memory. The method maintains time or capacity limited history record of requests to read deduplicated data. Responsive to a request for data received from a user, searching the deduplicated metadata cache in response to a user read request; and one of: finding the metadata in the cache and using the metadata from the cache to read the data stored in the storage memory; or determining that the metadata is not stored in the deduplicated metadata cache and retrieving the metadata from the metadata stored in the storage memory and reading the data stored in the storage memory.

In an aspect the history record may be searched either before or after the deduplicated metadata cache is searched, and: if before, searching the deduplicated metadata cache or, if after, adding the address to the history queue and retrieving the metadata from the storage memory. If the metadata is found in the history record, an access count associated with the found metadata is incremented, and if the count exceeds a predetermined threshold, the metadata is moved to the deduplicated metadata cache and removed from the history record. The history record is purged in accordance with a policy, which may be that a predetermined period of time has elapsed since the record was added to the history record.

The deduplicated metadata cache is also maintained so the metadata most likely to be useful in reading data, for the current state of the system is retained in the deduplicated data caches, while data that is less likely is discarded. Such data may be returned to the deduplicated data cache after again meeting the criterial set for the history cache.

In another aspect, the deduplicated metadata cache may be maintained by deleting metadata based on a heuristic that includes, age, reference count and access count, with respect to the other data in the cache. The cache may be in a partially full state so as to permit allocating the fast memory to other processes or other deduplicated memory extents.

In yet another aspect an extent of storage memory, which may be a logical unit (LUN) may be segmented into a plurality of memory regions, and a time-adaptive record of the relative read activity of each region maintained. Based on a relative activity level of the regions, the spatial distribution of read activity in logical address space may be maintained. This activity may be qualitatively described as "heat." Heat may be used to select the process or sequence of processes that are used to locate the metadata associated with the user read address. Where data is both temporally and spatially hot, the caches or queues having the most efficient response may be selected, whereas data that is infrequently accessed may be processed by a less efficient process.

A system for storing deduplicated data and practicing the method described above may comprise a non-volatile storage system that is adapted to store data processed by a deduplication method and having deduplicated metadata relating one or more user read addresses to a single data storage location. A processor with an associated higher speed memory which may be volatile or non-volatile memory may be used to accept read requests from a user and to maintain a cache of deduplicated metadata. The cache may be searched for metadata as the initial location and depending on the search success, a history record in the high speed memory may be searched, or the metadata retrieved from the storage system. Responsive to searches of the history record, the heat of an address may be determined and the retrieved metadata may be associated with the address.

The processor is configured to maintain the history record and the cache by taking account of the spatial or temporal activity level read requests, where the history record may represents a short interval for determining which metadata should be moved to the cache. The cache may be maintained by adding hot metadata and deleting cold metadata in accordance with a policy.

The write operations and the read operations for any address may not have similar temporal characteristics, and the storage of metadata is optimized for the state of the system for read requests at the time a read request is made.

BRIEF DESCRIPTION OF THE DRAWINGS

FIG. 2 is a simplified block diagram showing the relationship of a user system to a memory system where the communication between the user system and the memory system is over a data network;

FIG. 3 is a simplified block diagram of the memory system of FIG. 2 for a configuration where a cache device is in communication with a storage memory device;

FIG. 4 is a simplified block diagram of the cache device, which may comprise a processor receiving requests from a user and preforming search operations on the cached device, having a higher speed memory than that of the memory system;

FIG. 5 is a simplified block diagram of the memory system which may have a processor and a memory array which may be a FLASH memory;

DETAILED DESCRIPTION

Figure 1:
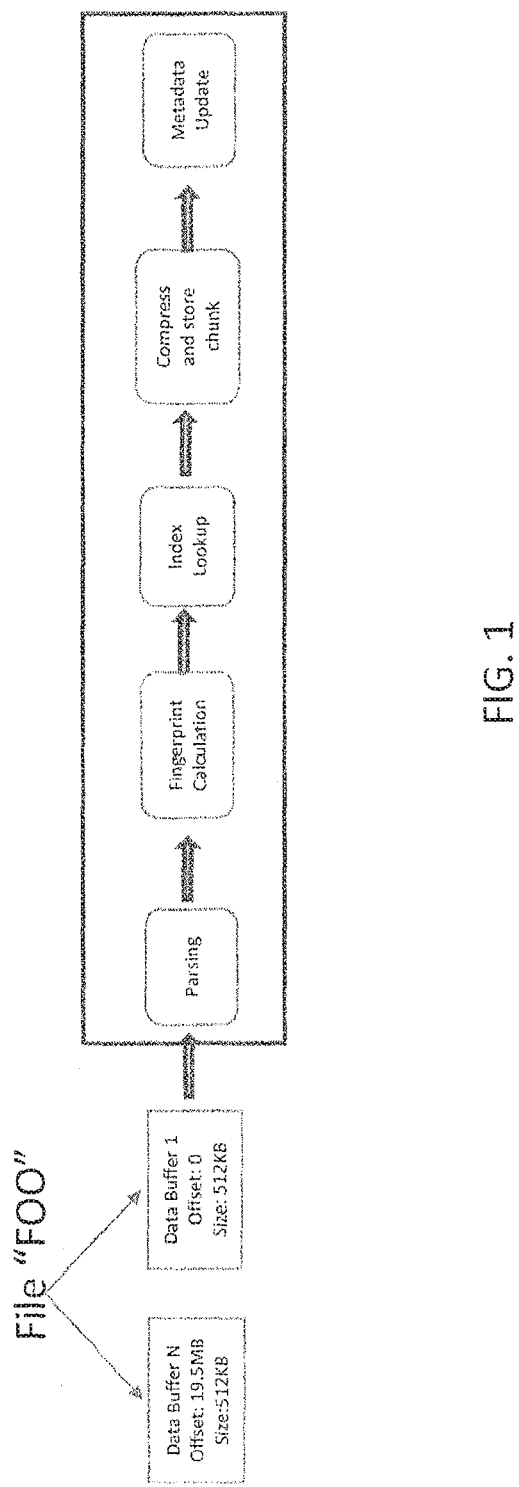
FIG. 1 illustrates the sequence of processing steps leading to metadata resulting from deduplication of written data where only one instance of the data is stored and the metadata may relate a plurality of logical addresses to the physical address at which the unique data is stored.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM, P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit such as a field programmable gate array (FPGA), application specific integrated circuit (ASIC) or other circuit which may use analog or digital circuitry, or discrete electronic components. So, a particular subroutine or function being performed by a programmed computer can be performed by a suitably designed logic circuit, as is known in the art.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

Where a large memory system is used cooperatively by a plurality of disparate users (e.g., clients, virtualized system), each user may be allocated an extent of logical memory space so as to maintain isolation of the access to such data by more than one user (which may be a virtualized system) to avoid compromising the integrity, confidentiality and service level that is expected or which may be specified. Management of such a system may be by allocating the memory space in extents termed logical unit numbers (LUNs) as an example. Each LUN may have an extent of 1 TB, for example, in current practice, but there is no intent to suggest that this is a limitation on the technique for allocating resources or the granularity with which the resource is managed. Groups of LUNs or the entire user accessible memory may be managed as an entity Since each LUN or group of LUNs that may be allocated to a specific user, which may be a virtualized environment, or individual user-allocated resources, a LUN may need to be isolated from the other users, and the management of the metadata describing the stored data itself may need to have a corresponding granularity and isolation. Alternatively, larger memory areas may use a common deduplication process and fingerprint table. For simplicity we describe primarily the operation of a deduplicated LUN, where a memory system may be servicing a plurality of such LUNs contemporaneously. This method and apparatus may be employed as a front-end to any deduplicated memory system, so the underlying method of performing deduplication is not described in detail. Data that has been processed by a deduplication system is termed deduplicated data, whether or not the specific data is found only once in the user representation of the stored data or whether a duplicate copy of the user data would have existed in storage memory at any epoch without the deduplication process having been performed. So, the situation at any epoch is that for a deduplicated LUN only one physical copy of a specific bit pattern for a page (unique data) is stored. Data that could be referenced by more than one user address is duplicative and is retrieved by using metadata that relates the multiple user addresses to the unique data that is common to the group of user addresses.

Deduplicaton may be performed either in-line (foreground) or the background (scheduled later, or as time permits depending on the approach taken, While deduplication might be performed selectively on sub-LUNs, we do not address this directly as it is a matter of granularity rather than process.

We discuss the aspects of foreground de-duplication that are relevant to a high performance memory system such as a RAM or FLASH memory array. Background or off-line deduplication is commonly used when backing up data for long-term storage, disaster recovery, and the like, or for lower performing resources.

In a background process, (which some products may use to accommodate peak foreground transaction loads) the deduplication is performed after the data has been stored in the non-volatile memory array, whereas a foreground process is performed contemporaneously with the storage of the data so that the duplicated data need not be stored. Since response time of the memory system having a non-volatile array as a storage device for reading and writing is an important consideration, enhancing the efficiency of the deduplication process is desirable when reading data as well as writing data. While the system and method is described in terms of a foreground process, aspects of the system and method may be used for background and back-up processing as the improved efficiency may be desired for such applications as well.

Background processing may also be performed on the data after storage in the memory array and before back-up processing so as to reduce the amount of data that is stored in the memory array. However, to do this, the data that is written to the memory array must first be stored in the non-volatile memory array. In a FLASH memory array it may be desirable to reduce the overall number of write operations, as well as the overall amount of data stored. Where data is stored prior to de-duplication, the data that is later found to be a duplicate of previously stored data is discarded once appropriate metadata for retrieving the duplicated data is stored, and so the data is no longer accessed and can be discarded. Erase operations are performed to reclaim the memory space where the now-deleted duplicate data had been stored, and erase operations are a primary cause of FLASH memory wear out. So, it is preferable to perform deduplicaton prior to storage of the data in the FLASH memory array when resources permit.

In comparison, foreground processing may not need to store the duplicate data more than once in the FLASH memory array and the number of write operations may be reduced by both the deduplication factor and any further reduction in data size due to compression of the deduplicated data. Other overhead operations, such as the mapping of the logical address space to the physical address space, for example by the Flash Translation Layer (FTL), garbage collection and wear leveling that would have been performed on the data later determined to be duplicate data may be avoided or reduced. Nevertheless, background deduplication or back-up deduplication may also be part of a system design.

Although this disclosure focuses on the efficiency of reading stored deduplicated data, a brief introduction of an example deduplication process is provided so as to establish the context and terminology.

A de-duplication process for a LUN may be described using the example shown in FIG. 1 where a File "FOO" (total of 20 MB in size) that may be comprised of 512 KB data extents, is ingested into a deduplication pipeline to perform a deduplication process. The data extents may be ingested sequentially based on the order of their logical file offset within a file. The data extent may be parsed so as to subdivide the extent into sub-extents for fingerprinting and deduplication processing as later described herein. The data may be compressed and stored and the metadata updated, including the deduplication metadata when duplicate data is encountered. Depending upon the deduplication process details, the sub-extents may be of fixed or variable size. For purpose of description, the sub-extents described herein may be 4 KB pages.

"Unique" data is a term that may be used for a single stored instance of a page of data which may or may not have multiple user references thereto. Deduplicated data is user data that has been processed to determine if an instance of the data is currently stored in the memory system. Where the data is a duplicate of stored data (the unique data), the duplicate data is referenced by using metadata to point to the already-stored unique data page that is common to a plurality of logical addresses. Deduplication metadata for duplicate data associates more than one user logical address with a single memory record stored in physical memory, such as a page, a file or the like. The discussion herein treats the stored memory record as being a page of data, for convenience, however any extent of data that has been deduplicated may be used.

The use of the term "deduplication metadata" is used to emphasize the specific purpose of the data being described, and the use of the term "metadata," for convenience in description, is not meant to omit metadata that may be related to the deduplication process, either for storing or for retrieving data. This data may describe the stored data, including the fingerprints, linked lists, tables, pointers and other information needed to retrieve the data requested by the using application. Such deduplication metadata may be referred to hererin as metadata. This does not exclude the use of other metadata at other levels of the system architecture, such as for the FTL (flash translation layer) of a memory module, or the like.

In an aspect, user file systems may make changes to a version of the file image stored in the memory array at a user accessible location (which may a logical interface, application program, or the like, located in a user environment) during a user session where all of part of the file was retrieved by the user, client, application, or the line and the entire written back to the storage medium, which may be the memory array, when the user session is closed. Consequently, files received for storage by the deduplication process from the user may comprise mostly "old" data representing the unmodified portions of the file, but may have new or modified data which may be unique and which needs to be identified and stored. The "old" data is identified in the deduplication process as having previously been stored in the memory array or memory system and only a reference to that that data is maintained in the deduplication metadata, which may updated as needed. New or modified data may result in creating of a new metadata page (which may be a file). New or modified data, which is determined not to have a previously stored copy is stored as new unique data. If the new or modified data has a duplicate representation in the memory then the deduplication metadata is updated by increasing the reference count and adding the new user logical address reference.

Where the term user logical address or similar is used, a person of skill in the art will appreciate that a the term will relate to a specific logical address of the user, but the numerical value of the address may have been subject to change through previous levels of indirection to the actual value being user at this level of the system.

Thus, data not currently having a stored duplicate (e.g., having a reference count of 1) may later be treated as duplicate data if a user attempts to store the same data associated with another logical address. Unique data that is to be stored may be addressed as blocks, pages, or the like, whose size may be dependent on the storage array design. Only one copy of any data is stored (the unique data), even if multiple user programs or multiple users access the data using differing logical addresses, LUNs, or the like.

Associated with each stored data element is a unique fingerprint, which may be a cryptographic hash, and other metadata which may include pointers or tables of indirection so as to permit the association of the location of the stored data in the storage system with the logical address used by the user to access the data. This "logical address' may have been resolved by higher levels of the software stack from some external representation related to the protocol with which the using application or system interacts with the storage system. The metadata for each valid page of data that has been stored includes a reference count that may include the number of user logical addresses that may access the data. So, a page having a reference count of 1 is unique in the sense that there only one user logical address that may access the data. Reference counts greater than one indicate that the data is indeed duplicate data as more than one user logical address read request will return the same data. Each time a new user logical address is associated with the page fingerprint, the reference count is increased. Conversely, each time that the user modifies the data at a logical address, the user logical address is deleted from the deduplication metadata and the reference count is decreased by one. Where the reference count becomes zero, there is no valid stored data having the associated fingerprint and the entry may be deleted.

Reference counts are managed as a part of the input deduplication process and may be thought of as a one measure of the stability of the data, as the higher the reference count, the more user writing activity is needed in order to eventually de-reference the fingerprint. Once stored, valid data may be read by the user, and the user's needs for retrieving data may differ from the storage of data. That is, a commonly accessed fingerprint may have a greater or lesser rate of user requests to read the stored data. We use an activity counter to monitor this access rate in some aspects of the system and method described herein.

A top-level view of the system 10 is shown in FIG. 2 where a user system 11, representing external users of the memory resource 12, connect to the memory resource by a communications path. The path may be internal to the system 10, when the system is "hyperconverged", or any suitable type of data transport protocol may be used, as is known in the art. The memory system 12, shown in FIG. 3 comprises a cache device 13 and a memory device 14. Again, these devices may be a same device sharing resources, or separate devices in communication with each other. The memory device 14 may be any apparatus for storing digital data, such as a FLASH memory array using NAND circuits, a disk array, or the like, and may be co-located with, or separated from, the cache device 13.

The cache device 13, shown in FIG. 4 may include appropriate interface circuitry to the communications resources, a processor 15 and a high-speed memory 16, as well as other components as are known in the art, but are not shown. The high-speed memory 16, which is often DRAM, is used to provide rapid access to the data stored thereon.

The memory array 14, shown in FIG. 5, may also comprise a processor 17, which may also have a high-speed memory (not shown) to perform management functions, local processing or caching, for example, and a memory array 18. The memory array 18 is intended to store a quantity of data in a non-volatile manner.

Memory systems storing data may be operated in a redundant manner where the received data is stored such that a failure of one or more components in the memory system does not lead to permanent loss of data or a significant degradation in system performance. Such redundant high-reliability systems are known and the techniques and architectures used are presumed to available for use in the system and method described herein. So, concepts such as RAID (Reliable Array of Independent Disks), redundant power supplies, hot swappable modules and the like may be used, as well as mirroring of data in separate non-volatile buffers such as NVRAM until it is stored in a reliable non-volatile medium.

Data may be stored in the memory array 18 as logical blocks, which may be 4 KB in size, or some multiple thereof, such as may be used in a data base system, where the blocks are tables of data or records in a file. Such blocks may be apparently randomly located within the logical memory space maintained by the data base, although there may be temporal locality. Blocks in a file may exhibit spatial locality in logical space.

As some types of data may not be amenable to effective deduplication, such as user-encrypted data, the LUN or sub-LUN of that type of user may not be identified as an extent of logical addresses to be deduplicated. For the purposes of an example, the data being processed corresponds to a LUN (logical unit number) or identified portion thereof where the data is to be subject to deduplication. Data may be compressed either prior to or subsequent to deduplication, and this processing step may be either user selected or heuristically determined.

Each chunk or block subject to the deduplication process may be processed, for example, using a cryptographic hash function, which may be a Secure Hash Algorithm (SHA) which is intended to uniquely identify the bit pattern of the chunk. Since the cryptographic hash value (message digest or fingerprint) is unique, the fingerprint may be used to represent the contents of the chunk (message) for comparison with later received chunked data so as to determine if the later received data is a duplicate of the already stored data.

A hashing algorithm processes an arbitrary length input message and results in a fixed length message digest as an output. This is considered a one-way mathematical function, as the original message (data) cannot be determined with certainty based on the message digest. The SHA gets the name "secure" since the algorithm was designed to make finding the original data from the hash value is computationally infeasible. SHA may be a cryptographic hashing algorithm specified by the National Institute of Standards and Technology (NIST) in Federal Information Processing Standards Publication 180 (FIPS PUB 180). Hardware implementations of this processing are available in INTEL architecture processors, for example, although this is not a limitation on the approach that may be used.

Other hashing algorithms such as a CRC may be used for fingerprinting and may be more computationally efficient; however, such algorithms may result in occasional erroneous matches where two chunks having different data yield the same hash value. Providing that each apparently duplicate result is further validated, as actually being a duplicate (such as, for example, by directly comparing the stored data with the potential duplicate, or by computing a cryptographic hash for comparison with a previously stored cryptographic hash) such algorithms are also usable.

Each time that a chunk of data is processed by hashing for de-duplication, a de-duplication hash table (fingerprint table) needs to be searched to determine if there is a match of the fingerprint with previously stored data. If no match is found, then there is no data chunk having the same data that has already been stored and the new data is novel. The novel (unique) data chunk needs to be stored to the memory array and the metadata describing the stored data location stored. The primary location of such metadata, which may include the hash table, may be either in the deduplication channel itself or in the storage array.

When in-line deduplication is being performed, the hash look-up table is searched and prior to storage of the data in the memory array. When a match between a computed hash and a hash value representing a de-duplicated data extent is encountered, the new data is not novel and need not be stored. But, the metadata referenced by the fingerprint needs to be updated so as to acknowledge the duplicate data and to redirect any read request for the duplicated data to the previously stored unique data that is the same data. Since the user may refer to the data by the file handle, inode, or other logical address or tag, a mapping between the user data reference and the metadata may also be updated. The metadata may also be updated to remove the specific reference whenever a logical address corresponding to the fingerprint value is deleted or modified. When all of the user references in the deduplication metadata to a unique page that contained duplicate data have been deleted, the corresponding metadata page may be deleted as well as the corresponding stored data.

The amount of metadata, in total, that may be needed to manage the deduplication of the LUNs of a large memory system may become unmanageable, as a high-performance system would desirably store all of this metadata in volatile (high-speed) memory close to the processing resources performing the deduplication and deduplication management. Such memory tends to be more expensive (e.g., dynamic random access memory (DRAM) or non-volatile random access memory (NVRAM)) and consumes more power than an equivalent extent of storage memory such as FLASH memory. From a cost, density and power consumption viewpoint, storing all of the metadata in high-speed memory may be impractical.

Since a memory system, such as a FLASH memory array may be in high-speed communications with the using system (a "client") using protocols such as Ethernet, PCIe, or the like, any delay in response due to a need to retrieve metadata from a slower storage area such as a hard disk drive (HDD), or even to retrieve metadata from the FLASH array itself, could mitigate the performance advantages of the FLASH memory system. Whereas latency in writing data may be subsumed by buffering data to permit batch processing, read operations depend on the total elapsed time between the read request and the reporting of the data, and are thus directly affected by processing delays, buffering or the like.

FLASH memory systems, such as the Violin Memory 6000 and 7000 series memory array and similar devices (available from Violin Systems LLC, San Jose, Calif.) have attributes that the read and write performance is predictable and has a low time variance and low latency when compared with hard disk or other data storage systems. These attributes may substantially improve the performance of the using application by minimizing wait states while the requested data is being retrieved in response to a read request or written in response to a write request. Consequently, the deduplication process, including the management of the associated metadata needs to avoid, for example, lock contention and unnecessary waiting for retrieval of the metadata from other memory locations. Such issues may be of lesser importance in disk memory systems which are known to exhibit frequent wait states to return requested data or to write data due to the seek and rotational latencies that are characteristic of rotating media. Existing FLASH memory arrays, such as those mentioned above, may have sustained read latencies of less than 200 microseconds and little variance in the latency time, and may have similar write latencies. Increases in read latency due to aspects of a deduplication process are likely to be more noticeable. If the metadata is stored in the FLASH memory array, caching of some of the metadata in high speed memory such as RAM may improve performance.

Write performance during de-duplication of data to be written may be sustained by buffering input data in NVRAM, such as is described in U.S. provisional application 62/079,194, filed on Nov. 13, 2014, entitled "Non-Volatile Buffering for Deduplication," which also describes optimizing deduplication operations for write operations. The application is commonly owned and is incorporated herein by reference. The need to retrieve metadata from the main memory array to service read requests for deduplicated data, even if the memory is high-performance FLASH memory, ought to be minimized so as to avoid increasing the latency in responding to user requests to read deduplicated data.

In another aspect, the patterns of user requests for read and for write operations may be quite variable, as each user and using application may have a diurnal, monthly, seasonal or yearly pattern of activity as well as transient events such as boot storms, loading of large files, or databases, or the like, that may not be scheduled by the memory system, as the users may be entirely autonomous of the memory system. Thus, the requirements of the users may be manifest primarily through the dynamics of the read and write requests received by the memory system.

Deduplicated data needs to be efficiently retrieved, and the system and methods described herein are predicated on having a deduplicated data set representing at least a portion of the stored data. The data set may be the result of foreground or background deduplication and may be relatively static or continuously maintained. The deduplicated data is referenced by metadata relating, at least indirectly, a user logical block address (LBA) of the data to the storage physical location of the deduplicated data in the storage memory through levels of indirection, as would be understood by a person of skill in the art. Where a particular data chunk is unique, the relationship of the LBA to the unique data storage location is one-to-one, whereas when the data chunk represents the data common to a plurality of LBAs the relationship is one-unique-storage-location-to-many LBAs. In a FLASH memory array, where the physical location of individual blocks of stored data may be effectively randomized by striping and other processes, fragmentation of the stored data may not materially affect the latency of read operations. However, the process of associating the LBA to be read with the metadata of the deduplicated data requires processing resources and introduces latency.

Here, for simplicity of exposition, we describe the operation of the system and method for a single LUN of the memory system for managing the retrieval of previously deduplicated data in response to user read requests. Other LUNs may use the system and method when performing operations on their deduplicated data. Yet other LUNs may be configured so as to store data without deduplication, or with background deduplication. The configurations may be selectively enabled or disabled by a user, system manager, or by an algorithmic process. While each LUN may be considered separately, some resources such as high-speed memory may be shared amongst the LUNs and the efficient use of such resources is also a design consideration. Moreover, the deduplication may be performed on a system-wide basis so as to be shared with many users, and be geographically distributed.

The metadata may be maintained in a non-volatile storage medium, which may be the FLASH memory array, while a cached portion of the metadata may be maintained in a memory that is faster and may be located, from an access time point-of-view, closer to the processor performing the data retrieval process and metadata maintenance. The actual physical arrangement of the apparatus may depend on specific design considerations, such as reliability, convenience of interfacing, maintenance and the like. So, for example, the deduplication process and metadata caching may be performed in a separate appliance such as the Violin Memory Concerto 2200 disposed between the using applications and a Violin Memory 6000 FLASH memory array. In an alternative, the deduplication process and metadata caching may be performed in a same apparatus as the FLASH memory array using a higher-speed memory such as DRAM, which may be accessed by a controller that is a part of the FLASH memory array. Thus, a separate deduplication processor may be used, or the memory array processor may be used for this purpose. The desirability of such choices may differ with differing uses or with the evolution of the various electronic components of the overall system, the scale size of the system and other design considerations.

In an aspect, all of the deduplication metadata may be maintained in the FLASH memory array and a copy of selected metadata maintained in a cache so as to improve the efficiency of reading deduplicated data. Generally the efficiency of access is improved by maintaining cached metadata for the most frequently accessed duplicate data as determined by a protocol. By limiting the cached metadata to the most recently and frequently used metadata, incoming requests to read data may be serviced by first searching for a match in the cache with the most frequently accessed duplicate data and, if that is not successful, searching the metadata of deduplicated data stored in the data storage array. The requested data may be read from the address in the memory system indicated by the metadata.

Metadata in the cache may relate a plurality of logical addresses to the unique memory array address where the deduplicated data of the plurality of logical addresses is stored. By arranging for the most frequently read, or recently read, duplicated data to be represented in the cached metadata, the latency in searching the metadata is reduced and the efficiency of the read process is increased.

A purpose of a metadata cache is to maintain a copy of frequently accessed metadata in high-speed memory while balancing the requirement for high-speed memory capacity and response time against economic factors. A cache of deduplicated metadata, as described herein, provides rapid look-up of the needed access information for frequently-read data and adaptively maintains the appropriate metadata data in the high-speed memory. Desirably, the amount of metadata should be adapted to the dynamics of the LUN being serviced so the high-speed memory of the cache can be used efficiently. Where only a small number of the chunks (e.g., pages) of data are frequently accessed, the amount of cached metadata may be similarly reduced. Metadata is modified during write operations, when the data to be written is determined to be already represented in the stored data (data being deduplicated that is duplicate data), and new deduplicated metadata is created for data that has no previously stored exact (duplicate) counterpart. The metadata is accessed when read operations are performed so as to determine the storage location of requested data that is deduplicated data and may be modified to record usage information.

The stored data and the metadata representing the stored unique data that is not duplicated and the unique data referenced by the deduplicated metadata may be stored separately, but the data types and the metadata may also be stored in a same memory array or cache memory. Metadata may be modified, stored and retrieved independently from the data that the metadata represents, and portions of the metadata may be mirrored in the cache memory.

A copy of the metadata representing a portion of the deduplicated data or all of the deduplicated data may be stored in a cache memory so as to represent the deduplicated metadata which itself may be maintained in the non-volatile memory. The latency of a FLASH array may be such that the retrieval of data from the FLASH array itself is not a performance limitation. This is not intended to suggest that actual data cannot or should not be stored in a cache memory in some circumstances. Storing only the metadata for frequently accessed deduplicated data in a cache of high-speed memory may reduce the time to search or maintain such metadata and increases the efficiency of retrieving the deduplicated data pointed to in the storage array by the cached metadata. Other system configurations may also store some of the deduplicated data or frequently accessed unique data in the cache memory.

Data in a memory array such as a Violin Memory 6000 FLASH Array is often stored in logical data blocks, which may have a size of 4 KB. This block size is typical of current generation arrays, but is not intended to be a limitation as both larger and smaller block sizes would be known to a person of skill in the art. Where a size of the logical data block is stated, such a data block may include extra storage areas for error correcting codes, other types of metadata, and data management information in addition to data having an extent equal to the nominal logical block size. The relationship between the metadata and the actual physical storage location of the data in the memory array referenced by the metadata data block is maintained by the operating system of the FLASH array, which may use a Flash Translation Layer (FTL) so as to facilitate processes such as garbage collection, wear leveling, refreshing, RAID and the like. For purposes of this disclosure, such operations are consider to be performed at a lower level of the system and the interface with the deduplication aspect of the system is at a logical block level, or similar abstraction. This logical block level is hidden from the user by indirection.

A history queue of recent user I/O read accesses may be maintained in the high speed memory so as to manage the contents of a metadata cache. Metadata for stored data that is frequently accessed may be maintained in the cache, and metadata that is less frequently accessed or becomes less frequently accessed due to changing user access patterns may be evicted from the metadata cache either when space is needed or as a matter of routine. This policy minimizes the amount of metadata that is initially searched to determine if the requested data may be deduplicated data. Since not all of the metadata may be in the cache, not all requests to read deduplicated data will result in cached metadata hits.

Metadata may be evicted from the cache even if the presently allocated cache memory space is not full, based on a heuristic. Having immediately available storage space in the cache memory may improve the response time when a substantial amount of new data or newly stored deduplicated data is accessed due to a rapidly changing workload. Generally, the least frequently accessed metadata is evicted from the cache. This activity may be managed by an ageing process where, even if the cache is not full, data meeting a predetermined age criteria or other criteria is evicted.

In another aspect, the cache may already be filled with metadata meeting the access activity requirements. In such circumstances, evicting metadata to immediately store the new metadata may be counterproductive as the new metadata has not as yet had an opportunity to justify being added to the cache on the basis of access frequency. Other options include allocating additional cache space from a system reserve cache pool, or changing the criteria for maintaining a metadata chunk in the cache. Herein we describe a history record or queue as a means of determining whether a request to read a particular LBA will result in adding the metadata to the cache using a frequency-of-access measure.

The metadata cache may be maintained on a system-wide basis or for each allocated LUN or grouping of LUNs. Where a frequency-of-access threshold is used to determine if metadata should be maintained in the cache, and there is more metadata meeting the criteria for storage in the cache than can be accommodated in an existing LUN cache size, a portion of a system cache pool may be allocated so as to increase the LUN metadata cache size. Some of this system cache pool may have been made available from other LUN metadata caches that do not have sufficient activity to fill their nominal allocated space. When the workload for the LUN decreases, the frequency-of-access criteria may result in shrinkage of the LUN cache size, and memory space may be relinquished to the system cache pool.

In an example, a 1 TB LUN comprised of 4 KB blocks may have the capability of operating at an input/output (I/O) rate of 100K input-output-operations-per second (KIOPS). Each metadata cache page (which may be a 4 KB page) may describe a 512 KB chunk of user data. During a one second period, the I/O activity results in an I/O history record comprising 100K accesses if all of the accesses are read requests. The total number of metadata pages needed to represent the 1 TB LUN may be 1 TB/512 KB=$2\times10^6$ pages. It may therefore be desirable to store the portion of the metadata for the most frequently accessed unique data and deduplicated data in a cache memory having higher speed access than when the data is stored the complete set of metadata pages During a one second time period, the probability of randomly hitting a particular metadata page is about 100 KIOPS/$2\times10^6$=0.05. A short-term I/O history record may be maintained in high speed memory, where the addresses that have been read are stored. Each of the metadata pages in the I/O history record represents at least a first hit on the page during the period of time that the page is in the history record. If, for example, three accesses to a cached page during a one second period is used as a criteria for adding a metadata page to the cache, then about 250 metadata pages per second ($(0.05)^3\times2\times10^6$) may be randomly added to the cache While this may appear to be a relatively modest rate of accretion, the number of metadata pages in the cache would grow to comprise all of the stored data pages over a period of time, and some method of pruning the cache is needed. Cache lookup activities for an I/O operation are more effective if the cache contains active ("hot" from a read perspective) metadata pages so that the number of entries to be searched initially is small. When there is a cache miss, the metadata may need to be accessed in the FLASH array, but the relative number of such accesses is small.

Where the activity in reading a particular page having duplicate data is high, the metadata page stored in the cache will be accessed more frequently than a random distribution of memory accesses. When an I/O read request is received, a tree of metadata pages in the cache may be traversed until the same LBA as requested is found, or the entire tree has been searched. Other methods of storing and searching for the metadata in the cache would be apparent to persons of skill in the art. A Bloom filter, such as later described in an example, may be used to determine that the metadata is not in the queue or cache being searched, without having to perform a detailed search. Since such a preprocessing step is subject to a finite false positive result, the descriptions herein are simplified so as to omit the step of bypassing the search based on a negative Bloom filter result. That is, the detailed description of the process assumes that the Bloom filter yielded a positive result and an actual search is necessary to determine if the object being searched for is in the queue or cache.

Figure 6:
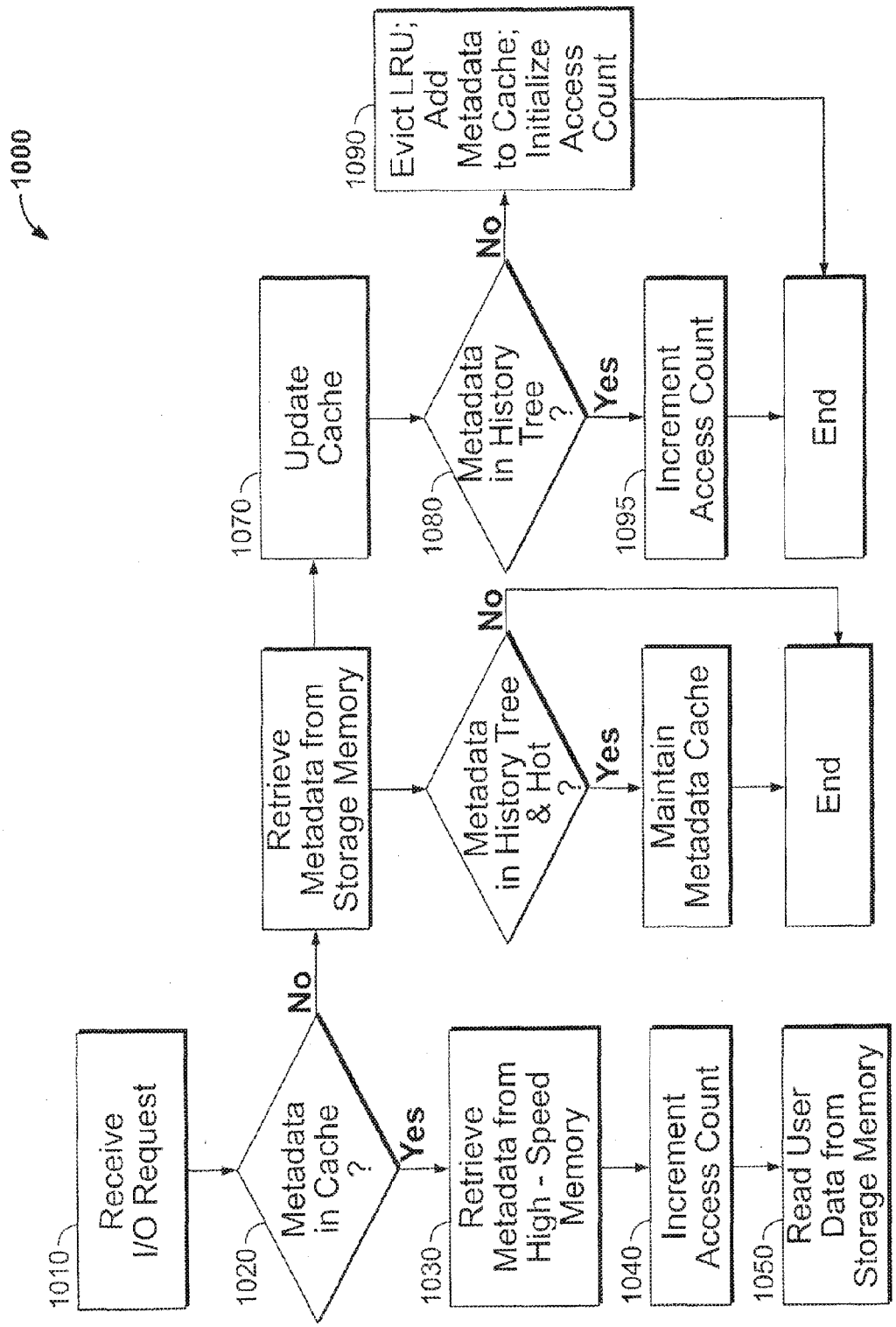
FIG. 6 is flow chart of an example of a process for retrieving metadata in response to a read request where the cache device having a metadata cache and a history record is searched to determine if the needed data is in the high speed memory, prior to searching the slower speed memory of the memory array.

Where, for example, a binary tree is used, activity counter may be maintained for each node of the tree and the counter at a node is incremented for each found LBA. The activity counter of each node may be decremented by a count after a period of time (for example, a second). Alternatively, nodes may be deleted after being aged for, for example, one second. Each time the counter is incremented, the activity count value of the node is tested. If the count value exceeds a predetermined value, the LBA is considered to be "hot". That is, it is being frequently used and the metadata may be more efficiently retrieved if the metadata were in the metadata cache. An example of this process is shown in FIG. 6

The cached metadata may be searched to determine if the metadata has already been stored in the cache, and if the metadata has been cached the metadata may be used to retrieve the data from the FLASH memory system. If the metadata is not present in the cache a copy of the metadata may be retrieved from the metadata stored in the FLASH memory system or other non-volatile memory and then stored in association with the history queue in high speed memory. The access (activity) count associated with the address in the history may be updated as well as, for example, a last access time. The data requested may then be retrieved from the FLASH memory system in accordance with the metadata.

In another aspect, a cache of the metadata for frequently accessed deduplicated data blocks may be stored in a queue. The cache may be a linked list or other data structure. Each time a LBA references metadata for a deduplicated block (and this would occur, for example, each time the user requested the data for a LBA of a deduplicated block represented by the metadata), the metadata that is referenced is moved to the head of the queue. In this manner, less frequently accessed metadata migrates further back from the head of the queue. So, if the queue has a finite length, the less frequently accessed metadata may eventually reach the tail of the queue and be discarded from the cache. This may be termed eviction of the least recently used unit (LRU).

In this manner, metadata of hot data is constantly being added to the cached queue and metadata for less frequently accessed metadata flushed from the queue. The queue thus represents the LBAs of the LUN that are most likely to be requested, based on the activity pattern of the user. A system-wide deduplication pool may be managed in a similar manner.

In an aspect, when a read request is received, a recent history record which may be a tree may be traversed. The history tree or queue maintains a record of the user logical addresses that have been read during the evaluation period and the number of times that the address has been accessed. When a user logical address is accessed, and it is not in the history tree or in the cached metadata, the metadata may be retrieved from the storage system and temporarily associated with the history tree. So, while the user logical address is still in the history tree, a subsequent access, in addition to incrementing the activity counter, may also be able to access cached metadata without reading it from the storage array or searching the cache. Such caching activity is optional.

As yet, the cached metadata is in or associated with the history tree and not in the metadata cache. This may reduce the access time for read requests for currently active logical address reads, but the cached metadata may not be added to the deduplicated metadata cache until a predetermined number of accesses (in the examples herein, three) occurs during the evaluation period (in the examples herein, one second). In an aspect, once the predetermined number of reads has occurred, the metadata may be added to the deduplicated cache and further accesses are serviced from the dedicated cache until the metadata is flushed from the cache in accordance with a policy. The access counter associated with the metadata may be incremented for each access to the specific metadata after the metadata is added to the deduplicated metadata cache, so as to manage the cache capacity. The cached metadata tree can be searched faster than the full metadata tree in the storage system, improving the performance of the deduplication system.

The above described process may be used both with foreground and background deduplication but, as the background deduplication process lags behind real time, data that has been received for the purpose of writing, but has not as yet been deduplicated will not be represented in the cached metadata. However, if a tree of recently written LBAs is maintained, the new data may be retrieved from the FLASH memory array without traversing the complete metadata tree representing the complete metadata for the LUN.

An example of a method 1000 of managing the metadata is shown in FIG. 6. The processing starts with a receiving an I/O request (1010) to read data from the memory array. The terms "hot" and "cold" are relative terms and in the present application the terms apply to the frequency of reading of valid data stored at a particular physical address. This is in contrast with the terms that may be used for similarly characterizing the stored data itself, where hot data may be data that is frequently updated, changed, or deleted. So, data may be both hot from a reading perspective in that many users or even a single user may be making frequent requests to read the stored data at a physical address. But the same data may be cold from a storage perspective as a particular data page may represent many duplicate copies, is therefore common to a large number of logical addresses and could not be changed unless all of the logical addresses relating thereto had been dereferenced by modifying the associated logical data and storing it elsewhere. Herein, we are referring to the frequency of reading the data stored in a particular storage memory location as being the heat of the data.

In this example, two caches are maintained. A first cache comprises the history record ("history") for a recent period which contains activity counters and may include addresses and associated metadata that is not in the main metadata cache. The main deduplicated metadata cache ("the cache") comprises metadata that has been added to the cache based on the criteria that the metadata represents frequently accessed data by one or more users ("hot") and that there was either space available to add the metadata to the cache, or space in the cache was created, for example, by evicting data that was cold enough to be evicted in accordance with a heuristic. In an aspect, the size of the cache may be adjusted using available memory from the system cache pool if the hot data cannot be added to the cache as there is no metadata meeting the criteria for eviction from the cache.

A tree of the cached metadata is searched (1020) to determine if the needed metadata page is in the cache, and if the metadata page is found, the metadata is accessed (1030) and the access count for the metadata record, which may be a page, may be updated (1035). The metadata is used to read the requested data from the memory array location identified by the metadata so as to complete the response to the read I/O request (1040).

If the metadata associated with the I/O request (1020) is not found in the deduplicated metadata cache, the history queue may be searched (1060) and in the address is in the history queue (1060), the access counter is updated (1070) and the data is read using the metadata (1080). However, if the address is not found in the history queue (1060), the metadata is retrieved from the storage memory (1065), for example, and both the address and the metadata added to the history queue. An access counter for the LBA associated with the metadata is initialized or incremented (1075) and the data is read using the metadata (1080).

The access counter for the address in the history queue is checked (1090) to determine if the address is hot, and if it is, the metadata cache is maintained by adding the address and metadata to the metadata cache in accordance with a policy.

A metadata record may need to be evicted from the metadata cache 2010 when there is hot data in the history queue (1090). Typically the metadata record being evicted, which may be a page, is the coldest metadata page as determined by a heuristic or was based on a time age (e.g., least recently used, LRU), or the length of time that the queue record is configured to be current The history queue is intended to represent the short term read activity pattern and may use a time based criterion for evicting addresses and metadata. In this example, a time period of 1 second may be used as the maximum age of the LBA record retained in the history queue. In an aspect, additional criteria may be used when the cache is full and there is no obvious candidate metadata page to be evicted, If the metadata becomes hot during the next 1 second period, it will again be a candidate for inclusion in the cached metadata by being in the history record.

Figure 7:
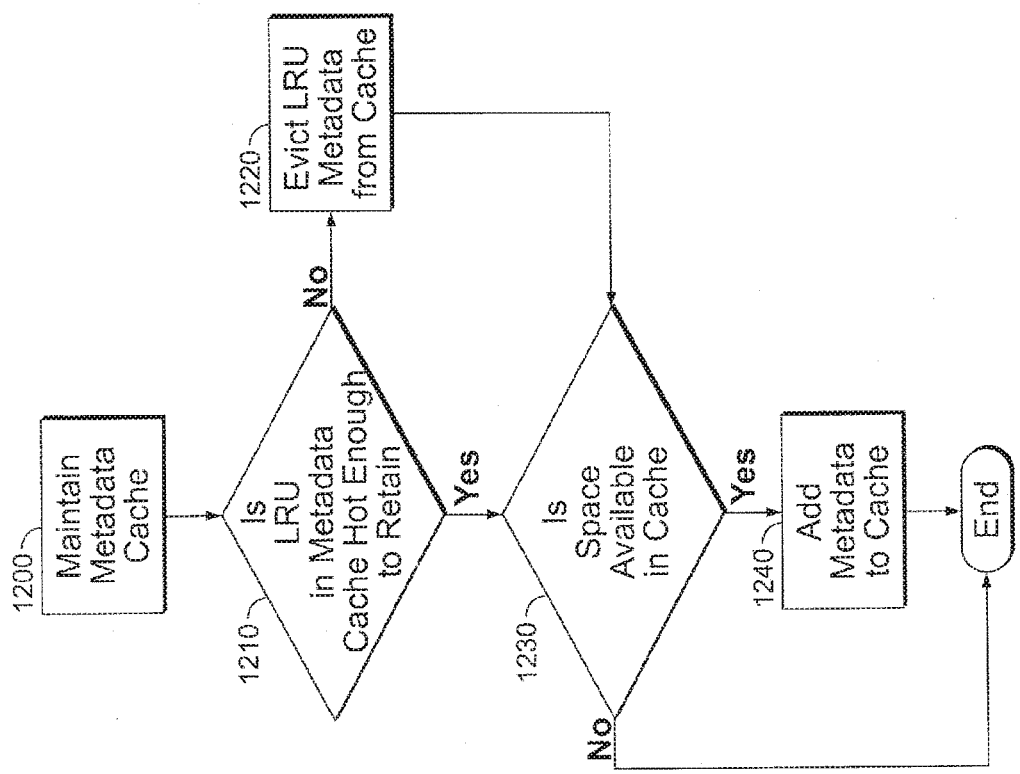
FIG. 7 is an example of a process for maintaining the current status of the metadata cache by adding metadata selected by the process from the history record and purging metadata in accordance with a policy.

If the metadata is in the history record and is hot, the metadata cache is maintained (1200) as shown in FIG. 7, where the process (1210) determines if any of metadata in the cache could be evicted. If there is metadata to be evicted from the cache (1220), after doing so the hot metadata is added to the cache (1240) and may be removed from the history tree. If there is no candidate metadata to be removed from the cache, the hot metadata may be added to the cache (1230) if there is cache space, in accordance with the specific protocol being followed and be deleted from the history cache. If metadata is again accessed, the process described above is repeated. In these examples, metadata may be hot where a number of accesses exceeds some value, for example 3, during the one second period. Where the reference count represents the number of LBAs referencing the common stored data, the reference counter value is another criterion for determining whether to evict metadata from the cache.

In outline then, the recent history of I/O read requests is maintained in a history cache, and when a read request occurs frequently enough during the time period that is encompassed by the history cache, the metadata becomes a candidate for addition to the main metadata cache. If there is sufficient space in the main cache, then the metadata is added. If there is not sufficient space, the metadata in the cache is evaluated to determine if there is metadata that can be evicted from the cache, or whether the cache space can be expanded. If neither of the actions can be taken, the metadata is used, but is not moved to the cache. The metadata may be deleted from the history record in accordance with the time policy or, alternatively, since it is hot, it may be reinserted in the history queue to avoid excessive storage memory accesses to retrieve it again.

Over a period of time, the metadata stored in the cache is determined in accordance with the pattern of I/O read requests, and the access count used as a measure of the data heat. In an aspect, the metadata may be rank ordered by access count so as to determine which metadata may be a candidate for deletion.

Figure 8A:
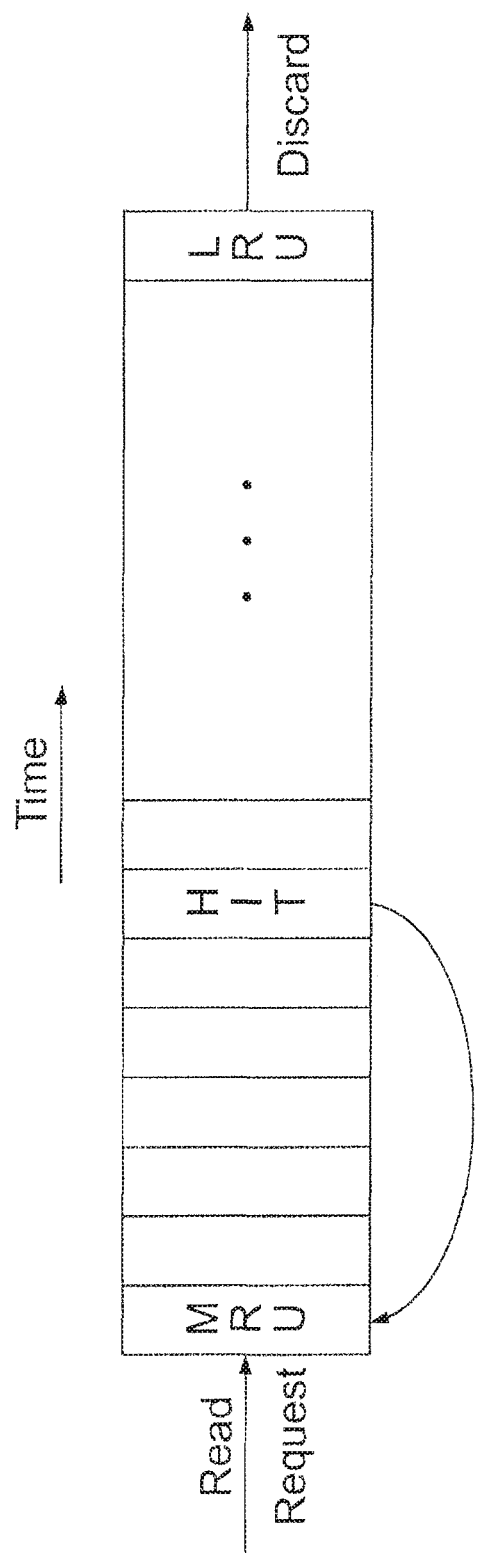
FIG. 8A is a schematic representation of the data space of the history record visualized as a first-in-first-out buffer with rearrangement of the data elements in response to a hit in the history record.
Figure 8B:
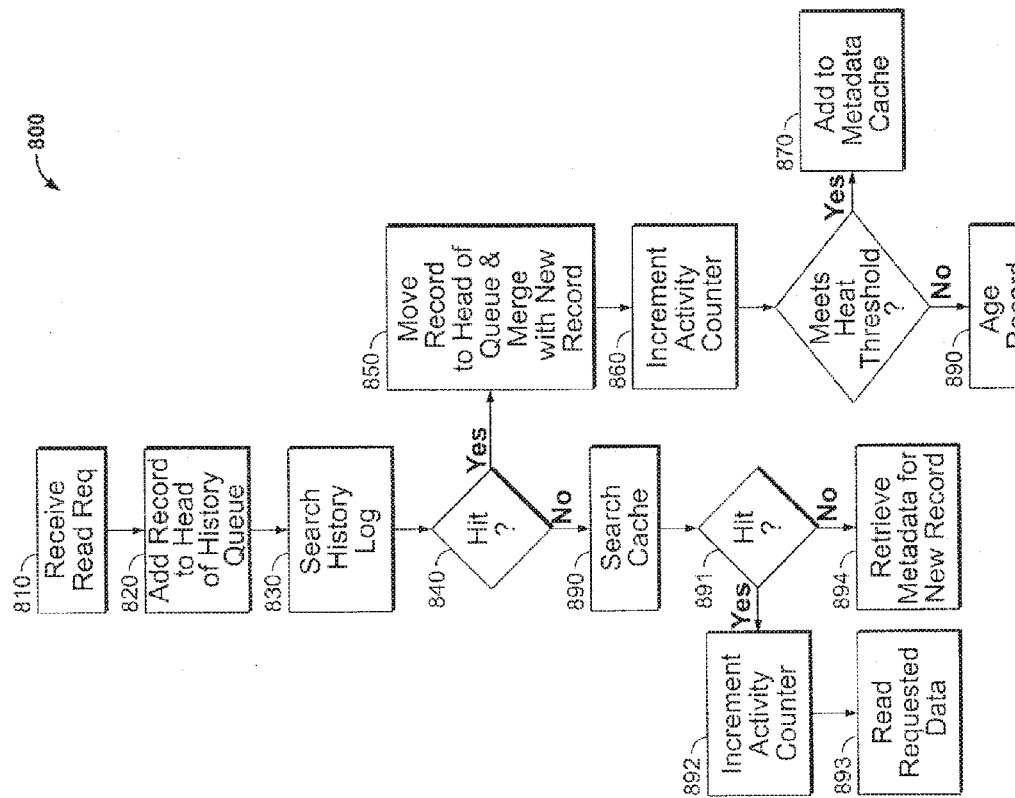
FIG. 8B is an example of a process that may be used to manage the history record as shown in with a process for determining the heat of the data read requests so as to select metadata for promotion from the history record to the metadata cache.

An example of maintaining the history file cache is shown in FIG. 8 where the history file may be viewed as a queue having a finite length (FIG. 8A). Each read request (MRU=most recently read) is inserted at the front of the queue and if there is no more room at the rear of the queue the oldest (LRU=least recently read). Where the address being read is found in the history file (a "hit"), the address may be merged with the MRU and an activity counter incremented. Thus, hotest hot addresses will be in the history queue.

The method of maintaining the history queue 800, may include receiving a request to read data 810; adding the requested address record to the head of the queue 820; searching the history queue 830 to determine if the address is in the history record. Note that the deduplicated metadata for this address would therefore have been recently retrieved from the deduplicated metadata in the storage system. Thus, the metadata to read the requested address is present in the cache associated with the history queue and the read request is processed without further lookup. If there is a cache hit, the address is moved to the head of the queue 850 and the activity counter for the address is incremented. The activity counter may be tested against a predetermined threshold value (3 in a previous example) and if the value is reached, the page of metadata associated with the address is added to the deduplicated metadata cache. In an aspect, the address may remain in the history file but be marked to indicate that it is in the deduplicated metadata cache. This would result in immediately reading the associated data. The address may remain in sequence in the history queue and, regardless of activity, be flushed from the queue eventually as the LRU. Where insufficient accesses to meet the criteria for moving the address to the deduplicated metadata queue are found when the address becomes the LRU, the address and the associated metadata is discarded from the history queue. In the event that at step 840, the address was not found in the history queue, there exist two possibilities. The first is that the data is in the deduplicated data queue and the second is that it is not. So, the deduplicated data queue may be searched 890 and if there is a hit, the activity counter of the cached deduplicated metadata page is incremented 892 and the read request serviced 894. Where the address is not in the deduplicated data cache, the deduplicated metadata may be retrieved from the deduplicated metadata in the storage memory and associated with the address in the history queue. The net effect of this is to move the most frequently accessed deduplicated metadata to a position where the search is likely to involve the least resources since the size of the data structure to be search is smaller than that of the full deduplicated metadata.

As a consequence of this method, the metadata maintained in the cache remains current with respect to the recent pattern of activity of the LUN initiated by the user that owns the LUN while managing the total amount of fast-access memory devoted to the metadata cache and cache management function. While a one second time history cache length has been used as an example, this may be varied by the system designer, or be a characteristic of the LUN based on the level of service to be provided. Further, the order of searching the history queue and the metadata cache may be determined by a spatial heat of the read addresses.

In yet another aspect, the LUN may be further allocated by the user, which may be, for example, a virtualized system such that sub-LUNs are created for the exclusive use of a particular guest user. Within the assigned LUN, due to the differing usage patterns of the guest users, there may be regions having temporal or spatial locality that could be used to further optimize the servicing of requests for deduplicated data. Here we may consider that the entire LUN has been enabled for deduplication and the virtualized system freely allocates memory space within the LUN to guest users on the basis of sub-LUNs, autonomously of the guest user and the memory system. So, sub-areas of the LUN address space may exhibit independent patterns of read or write activity.

LBA regions having a high access count may represent sub-LUN regions where there is a greater percentage of active deduplicated data at present, and reflect the underlying activity of the guest user application.

Since searching the metadata in the cache uses system resources, and searching the main metadata uses more system resources, it may be preferable to avoid searching the metadata where there is either lower activity of a guest application or where the data of the guest application is not highly deduplicated. So, logical address regions of the metadata and history queue having a high current count ("hot regions") are more likely to result in cache hits than regions with a low current count ("cold regions"). Read requests located in hot regions may be directed first to the history cache and the cached metadata and, if no match is found, to metadata located in the slower storage memory. Read requests that are located in cold regions may be directed to either the metadata of the deduplicated data in the slower main memory. In this manner random data requests from low activity users and where there may be a lower likelihood of deduplicated data may bypass the process for retrieving deduplicated data. On balance, this may result in random requests being serviced without the overhead of the retrieval of deduplicated metadata data. In an alternative, an address that is in a cold region is added to the history queue for all read requests, and the metadata is searched in the storage memory for the metadata which is used to retrieve the required data. The metadata is cached in the history queue should the address be read again during the 1 second duration of the history queue.

The method of focusing the lookup of cached metadata based on temporal and spatial locality may be overlaid on the process of determining which metadata should be selected for caching. The processes interact as the usage patterns change, both the metadata that is in the cache evolves, as does the filtering of the LBA region for which the cache is being searched for deduplicated data. Reselection of LBAs to be searched in the cached metadata or the history file may also use a counting Bloom filter in conjunction with the history file or separately so as to minimize the number of unsuccessful searches.

Figure 9A:
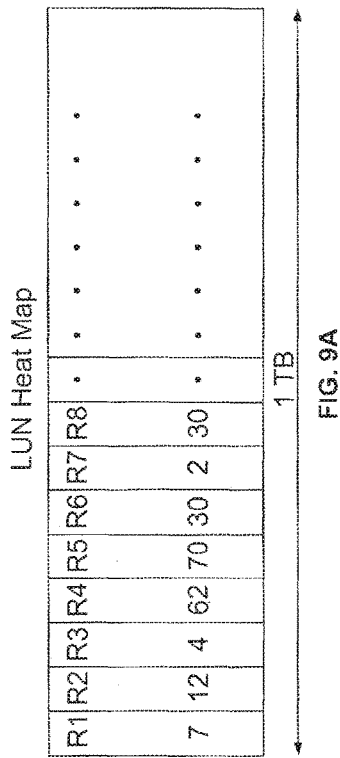
FIG. 9A is a schematic representation of the address space of a logical unit, being divided into regions where the read activity is monitored to determine the heat of the region at the epoch of time immediately preceding the read request.
Figure 9B:
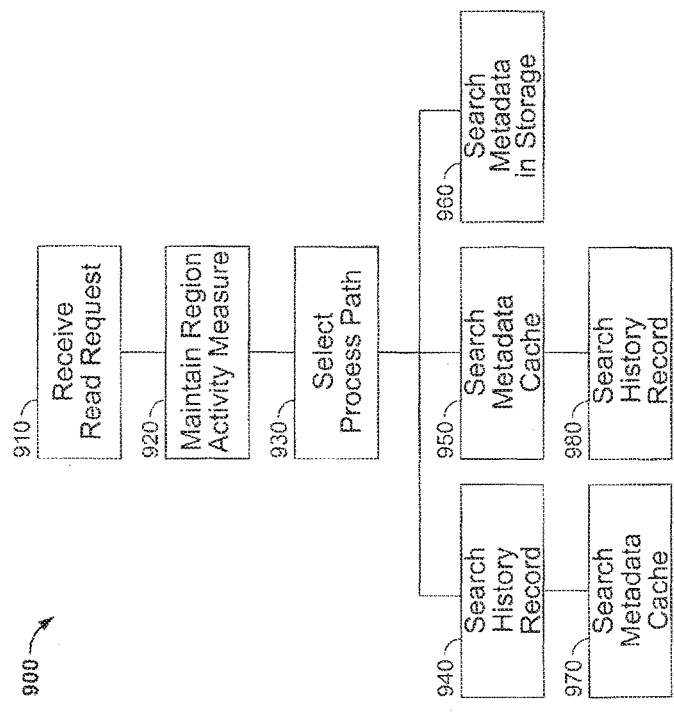
FIG. 9B is an example of a process for maintaining an adaptive measure of the heat of regions of the logical unit so as to determine a metadata retrieval search sequence.

In an example (FIG. 9), a LUN of 1 TB size may be partitioned into $2 \times 10^6$ separate continuous 512 KB regions R of 4 KB pages. The number of read requests in each of the regions may be maintained, for example, as an exponentially decaying function of time or of read request rate. FIG. 9A shows this situation where each of the regions R may be expected to exhibit a different pattern of access activity. The relative activity is shown as a count value. While the source of this activity may not be discernable to the deduplication cache manager, the relative frequency of access by region may be used to route the read request to a particular processing stream. By maintaining the activity "heat" by region, the hot regions for reading data may be processed more effectively.

The method may comprise dividing an extent of logical memory addresses, which may be a LUN into regions R and keeping a record of the short-term read request activity. Based on the heat of the region, the read request may be: a) routed to the deduplicated metadata cache; b) routed to the history record cache subsequently to the deduplicated metadata cache if the address was not in the history cache; or c) routed to the deduplicated metadata in the storage memory. Generally one would wish to provide the most efficient processing of the read requests, where the most frequently accessed deduplicated data is searched by the most efficient process. A presumption may be made that the most frequently read data in any epoch is the most likely to be deduplicated data. Since the most frequently read data may depend on the epoch time, for events like boot storms, data dumps or the like, the use of a time-dependent pre-filter as shown in provides an adaptive allocation of processing and memory resources.

The method 900 may comprise receiving a read request for data stored in the LUN by the client 910 and updating the activity count of the region R containing the address for which a read operation is requested. As the activity is expected to evolve with time, the exponential average technique, a periodic counter decrement of the like may be used to normalize the data set. As shown, the relative heat of the regions R ranges from 2 to 70. This value can be used to select the process path 930 to be followed in order to retrieve the data. In this example, regions R having a heat of 30 and higher may be routed first to the history queue 940 as there is a higher probability that the deduplicated metadata is in the history queue or failing that occurrence, the deduplicated metadata is in the deduplicated metadata queue. For less hot data, let us say between 5 and 30, there is a lower probability that the data is in the history queue, but it may be in the deduplicated metadata cache, and the deduplicated metadata cache is searched first 950 and then the history cache. For cold data, the first instance may be to retrieve the metadata from the metadata in the storage system 960.

The initial step of any of the searches of the history queue or the deduplicated metadata cache may be to use a Bloom filter to determine if the address is in either the history queue or the deduplicated metadata cache. This type of filter is a space-efficient probabilistic data structure that may be used to test whether an element is a member of a set. False positive matches are possible, but false negatives are not. This substantially reduces the percentage of the addresses that result in an actual search of the history file or deduplicated metadata queues.

When methods are described, and a listing of steps to be performed is given, it should be understood that the ordering of the steps is illustrative and steps the method may be combined, omitted, reordered, repeated or the like without departing from the teachings of the disclosure. Similarly, in the claims, the use of letter or numerical identification of clauses is for clarity in description and does not imply a restriction on the sequence of performance of the steps in the method.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A computer system for storing data comprising:
a non-volatile storage memory;
a memory having a higher speed than at least a portion of the non-volatile storage memory where deduplicated data is stored;
a processor in communication with the non-volatile storage memory and the higher speed memory;
wherein the processor is configured to:
maintain metadata for deduplicated data stored in the non-volatile storage memory;
maintain a subset of the metadata for the deduplicated data in a deduplicated metadata cache in the higher speed memory in accordance with a first policy;
maintain a history record of user read requests for deduplicated data received by the processor; and
search the deduplicated metadata cache in response to a user read request; and, to select between one of:
if the metadata for the deduplicated data is found in the deduplicated metadata cache, read the deduplicated data from the non-volatile storage memory using the metadata in the deduplicated metadata cache and respond to the user read request; or,
if the metadata for the deduplicated data is not found in the deduplicated metadata cache, read the metadata for the user read request from the non-volatile storage memory and read the deduplicated data from the non-volatile storage memory using the metadata and respond to the user read request.

2. The system of claim 1, wherein the processor is further configured to:
search the history record, responsive to a user read request; and, if the metadata for the user read request is in the history record, increment an access counter value for the metadata corresponding to the user read request; and purge the history record after a first predetermined time has elapsed.

3. The system of claim 2, wherein the first policy includes: configuring the processor to:
determine if the access counter value for metadata corresponding to the user read request exceeds a threshold value; and
add the metadata corresponding to the user read request to the deduplicated metadata cache.

4. The system of claim 2, wherein first policy further comprises the processor configured to:
determine if the access counter value associated with a user read request in the history record exceeds a threshold value; and
determine whether space is available in the high speed memory and allocated to the deduplicated data cache, and to select between:
if space is available, add the metadata to the deduplicated metadata cache; or
if space is not available, determine if metadata can be evicted from the deduplicated metadata cache in accordance with a second policy; and
if metadata can be evicted, evict the metadata.

5. The system of claim 4, wherein the second policy further comprises the processor configured to determine whether metadata can be evicted from the deduplicated metadata cache based on at least one of:
a number of read requests to metadata in the deduplicated metadata cache during a second predetermined time; or
an age status of the metadata in the metadata cache, determined as the time that the metadata has been in the deduplicated data cache; or
the age status of the metadata determined as a quotient of the number of read requests to the metadata in the deduplicated metadata cache divided by a time that the metadata has been in the deduplicated data cache; and
to select at least one of:
retain metadata in the deduplicated metadata cache when the number of read requests for the metadata during the second predetermined time exceeds a threshold;
retain data in the deduplicated metadata cache when the age status of the metadata in the deduplicated metadata cache is less than a third predetermined time; or
retain data in the deduplicated metadata cache when the age status as a quotient of the number of read requests for the metadata and a time that the metadata has been in the deduplicated metadata queue is greater than a predetermined value; and,
to evict metadata not selected for retention from the deduplicated metadata cache when space is not available in the deduplicated metadata cache to add metadata from the history record.

6. The system of claim 1, wherein the processor is configured to: search the history record responsive to a user read request prior to the search of the deduplicated metadata cache and to use the first metadata found to read data from the non-volatile storage memory.

7. The system of claim 6, wherein the processor is configured to use a Bloom filter to determine that the metadata is not in the deduplicated metadata cache and to read the metadata from the non-volatile storage memory when the metadata is not in the deduplicated data cache.

8. The system of claim 7, wherein the processor is configured to use a Bloom filter to determine that the metadata is not in the history record prior to determining whether the metadata is in the deduplicated metadata cache.

9. The system of claim 1, wherein the processor is configured to maintain an auxiliary history record in the high speed memory and to:

determine a number of read requests for each of a plurality of logical address space extents and to select at least one of the logical address extents as a filter such that the user read request within the selected logical address extent is initially directed to the history queue to search for metadata.

* * * * *